(12) United States Patent
Chen et al.

(10) Patent No.: US 10,813,100 B2
(45) Date of Patent: *Oct. 20, 2020

(54) MANAGING DOWNLINK AND UPLINK RESOURCES FOR LOW COST USER EQUIPMENTS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,472

(22) Filed: Oct. 17, 2016

(65) Prior Publication Data

US 2017/0034813 A1     Feb. 2, 2017

Related U.S. Application Data

(63) Continuation of application No. 13/756,938, filed on Feb. 1, 2013, now Pat. No. 9,491,738.

(Continued)

(51) Int. Cl.
*H04W 4/00* (2018.01)
*H04W 72/04* (2009.01)
*H04W 24/08* (2009.01)

(52) U.S. Cl.
CPC ......... *H04W 72/048* (2013.01); *H04W 24/08* (2013.01); *H04W 72/04* (2013.01); *H04W 72/044* (2013.01)

(58) Field of Classification Search
CPC . H04W 72/04; H04W 72/044; H04W 72/048; H04W 88/08; H04L 5/00

(Continued)

(56) References Cited

U.S. PATENT DOCUMENTS 5,448,759 A    9/1995  Krebs et al.
6,219,840 B1   4/2001  Corrigan et al.
              (Continued)

FOREIGN PATENT DOCUMENTS

CN    102300267 A    12/2011
CN    102316535 A    1/2012

OTHER PUBLICATIONS

Intel Corporation: "Performance evaluation of cost reduction strategies for low-cost MTC UEs based on LTE", 3GPP Draft; R1-120210, 3RD Generation Partnership Project (3GPP), Mobile Competence Centre; 650, Route Des Lucioles; F-06921 Sophia-Antipolis Cedex; France, vol. RAN WG1, No. Dresden, Germany; 20120206-20120212, Feb. 1, 2012 (Feb. 1, 2012), XP050563169.

(Continued)

*Primary Examiner* — Robert J Lopata
(74) *Attorney, Agent, or Firm* — Linda G. Gunderson; Patterson & Sheridan LLP (57) ABSTRACT

Certain aspects of the present disclosure relate to techniques for assigning resources for low cost user equipments (UEs). A method for wireless communications by a user equipment (UE) is provided. The method generally includes determining a first bandwidth, within a second bandwidth, for resources available for downlink data transmissions, wherein the first bandwidth is greater than the second bandwidth, determining a third bandwidth for resources available for uplink transmissions, wherein a bandwidth for resources available for uplink transmissions is different than the bandwidth for resources available for downlink transmissions, wherein the third bandwidth is greater than the first bandwidth, and communicating with a network using the determined downlink and uplink resources.

10 Claims, 10 Drawing Sheets

Related U.S. Application Data (60) Provisional application No. 61/595,004, filed on Feb. 3, 2012, provisional application No. 61/595,466, filed on Feb. 6, 2012.

(58) Field of Classification Search
USPC .......................................................... 370/329
See application file for complete search history.

(56) References Cited

U.S. PATENT DOCUMENTS

| | | | |
|---|---|---|---|
| 8,045,580 B2 | 10/2011 | Hamada et al. | |
| 9,549,314 B2* | 1/2017 | Ode | H04W 8/22 |
| 2002/0119783 A1* | 8/2002 | Bourlas | H04W 72/1252 |
| | | | 455/453 |
| 2002/0173277 A1* | 11/2002 | Takao | H04W 16/04 |
| | | | 455/77 |
| 2004/0105463 A1 | 6/2004 | Cheung et al. | |
| 2005/0245258 A1* | 11/2005 | Classon | H04L 5/0037 |
| | | | 455/434 |
| 2007/0230414 A1* | 10/2007 | Afrashteh | H04B 7/2621 |
| | | | 370/338 |
| 2009/0274073 A1* | 11/2009 | Sutton | H04W 4/20 |
| | | | 370/280 |
| 2010/0124183 A1* | 5/2010 | Sorond | H04B 7/2615 |
| | | | 370/280 |
| 2010/0195586 A1 | 8/2010 | Choi et al. | |
| 2011/0032848 A1* | 2/2011 | Sagae | H04W 48/08 |
| | | | 370/278 |
| 2011/0033051 A1* | 2/2011 | Steer | H04L 5/0007 |
| | | | 380/270 |
| 2011/0122794 A1* | 5/2011 | Kim | H04L 1/0026 |
| | | | 370/252 |
| 2011/0134874 A1* | 6/2011 | Nakao | H04L 5/0094 |
| | | | 370/329 |
| 2011/0261732 A1* | 10/2011 | Tanno | H04W 16/14 |
| | | | 370/281 |
| 2011/0267978 A1* | 11/2011 | Etemad | H04L 5/003 |
| | | | 370/254 |
| 2011/0286407 A1 | 11/2011 | Vajapeyam et al. | |
| 2011/0287804 A1* | 11/2011 | Seo | H04W 52/146 |
| | | | 455/522 |
| 2012/0008575 A1* | 1/2012 | Vujcic | H04W 74/002 |
| | | | 370/329 |
| 2012/0076086 A1 | 3/2012 | Bercovich et al. | |
| 2012/0093103 A1* | 4/2012 | Lee | H04L 5/0053 |
| | | | 370/329 |
| 2012/0182858 A1* | 7/2012 | Nakao | H04L 1/1854 |
| | | | 370/216 |
| 2012/0250591 A1 | 10/2012 | Diao et al. | |
| 2012/0257551 A1* | 10/2012 | Diao | H04W 72/048 |
| | | | 370/280 |
| 2012/0263117 A1* | 10/2012 | Love | H04L 5/003 |
| | | | 370/329 |
| 2012/0263118 A1* | 10/2012 | Love | H04W 72/1215 |
| | | | 370/329 |
| 2012/0263189 A1 | 10/2012 | Vijayasankar et al. | |
| 2012/0307781 A1* | 12/2012 | Enomoto | H04L 1/1861 |
| | | | 370/329 |
| 2012/0327783 A1* | 12/2012 | Moon | H04L 1/1861 |
| | | | 370/241 |
| 2012/0327883 A1* | 12/2012 | Yang | H04L 1/0026 |
| | | | 370/329 |
| 2013/0051342 A1* | 2/2013 | Aiba | H04L 1/1893 |
| | | | 370/329 |
| 2013/0058291 A1* | 3/2013 | Ahn | H04L 5/0007 |
| | | | 370/329 |
| 2013/0100924 A1* | 4/2013 | Striuli | H04W 48/18 |
| | | | 370/329 |
| 2013/0163571 A1* | 6/2013 | Ouchi | H04W 72/042 |
| | | | 370/336 |
| 2013/0196701 A1 | 8/2013 | Tiirola et al. | |
| 2013/0201936 A1 | 8/2013 | Chen et al. | |
| 2014/0133367 A1* | 5/2014 | Chen | H04L 5/16 |
| | | | 370/279 |
| 2014/0177467 A1* | 6/2014 | Kim | H04W 52/242 |
| | | | 370/252 |
| 2014/0321400 A1* | 10/2014 | Seo | H04W 52/146 |
| | | | 370/329 |
| 2014/0348078 A1* | 11/2014 | Kim | H04W 52/146 |
| | | | 370/329 |
| 2015/0305021 A1* | 10/2015 | Yang | H04L 5/0053 |
| | | | 370/294 |

OTHER PUBLICATIONS

International Search Report and Written Opinion—PCT/US2013/024533—ISA/EPO—dated Jun. 3, 2013 (121358WO).

Ipwireless Inc: "Backwards compatible support for reduced bandwidth MTC LTE UEs", 3GPP Draft; R1-114268, 3RD Generation Partnership Project (3GPP), Mobile Competence Centre; 650, Route Des Lucioles; F-06921 Sophia Antipolis Cedex; France, vol. RAN WG1, No. San Francisco, USA; 20111114-20111118, Nov. 8, 2011 (Nov. 8, 2011), XP050562174.

NEC Group: "Maximum Bandwidth Reduction for Low-Cost MTC UE based on LTE", 3GPP Draft; R1-120259, 3rd Generation Partnership Project (3GPP), Mobile Competence Centre, 650, Route Des Lucioles, F-06921 Sophia-Antipolis Cedex, France, vol. RAN WG1, No. Dresden, Germany, 20120206-20120210, Jan. 31, 2012 (Jan. 31, 2016), 6 Pages, XP050562813, title section 2.2 Bandwidth sharing.

Qualcomm Europe: "Carrier Aggregation Operation in LTE-Advanced", 3GPP Draft; R1-083193, 3RD Generation Partnership Project (3GPP), Mobile Competence Centre; 650, Route Des Lucioles; F-06921 Sophia-Antipolis Cedex ; France, No. Jeju; 20080812, Aug. 12, 2008 (Aug. 12, 2008), XP050316622.

Catt: "Discussion on the bandwidth reduction for low cost MTC UEs", 3GPP TSG RAN WG1 Meeting #68, R1-120114, Dresden, Germany, Feb. 6th-10th, 2012, 3 pages.

Ericsson: "Standards aspects impacting MTC LTE UE costs", 3GPP TSG-RAN WG1 Meeting #67, R1-113683, San Francisco, Nov. 14th-18th, 2011, 3 pages.

Ipwireless Inc: "Review of Approaches for Bandwidth Reduction for Low Complexity MTC LTE UES," 3GPP Draft; R1-114267, 3rd Generation Partnership Project (3GPP), Mobile Competence Centre; 650, Route Des Lucioles; F-06921 Sophia-Antipolis Cedex; France, vol. Ran WG1, No. San Francisco, USA; 20111114-20111118, Nov. 9, 2011 (Nov. 9, 2011), 5 pages, XP050562333, [retrieved on Nov. 9, 2011].

Qualcomm Incorporated: "Impact of Reduction of Maximum Bandwidth on MTC", 3GPP TSG-RAN WG1 #68, R1-120563, Feb. 6-10, 2012, Dresden, Germany, 3 pages.

ZTE Corporation, "TP for evaluation/analysis of reduction of maximum bandwidth," [online], 3GPP TSG-RAN WG1#68 R1-120290, Jan. 31, 2012, 4 pages. Retrieved from the internet—URL:http://www.3gpp.org/ftp/tsg_ran/WG1_RL1/TSGR1_68/Docs/R1-120290.zip.

* cited by examiner

MANAGING DOWNLINK AND UPLINK RESOURCES FOR LOW COST USER EQUIPMENTS

CLAIM OF PRIORITY UNDER 35 U.S.C. § 119

This application is a continuation application of, and claims the benefit of priority from, U.S. patent application Ser. No. 13/756,938, filed Feb. 1, 2013, which in turn claims benefit of U.S. Provisional Patent Application No. 61/595,004 filed Feb. 3, 2012, and U.S. Provisional Patent Application No. 61/595,466 filed Feb. 6, 2012, all three applications being assigned to the assignee hereof and expressly incorporated by reference herein in their entireties.

BACKGROUND

I. Field

Certain aspects of the disclosure generally relate to wireless communications and, more particularly, to techniques for assigning resources for low cost user equipments (UEs).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide techniques for managing resources, for example, by a low cost user equipment (UE).

Certain aspects provide techniques, corresponding apparatus and program products, for wireless communications by a user equipment (UE). The techniques generally include determining a first bandwidth, within a second bandwidth, for resources available for downlink data transmissions, wherein the first bandwidth is greater than the second bandwidth, determining a third bandwidth for resources available for uplink transmissions, wherein a bandwidth for resources available for uplink transmissions is different than the bandwidth for resources available for downlink transmissions, and wherein the third bandwidth is greater than the first bandwidth, and communicating with a network using the determined downlink and uplink resources.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Network

Figure 1:
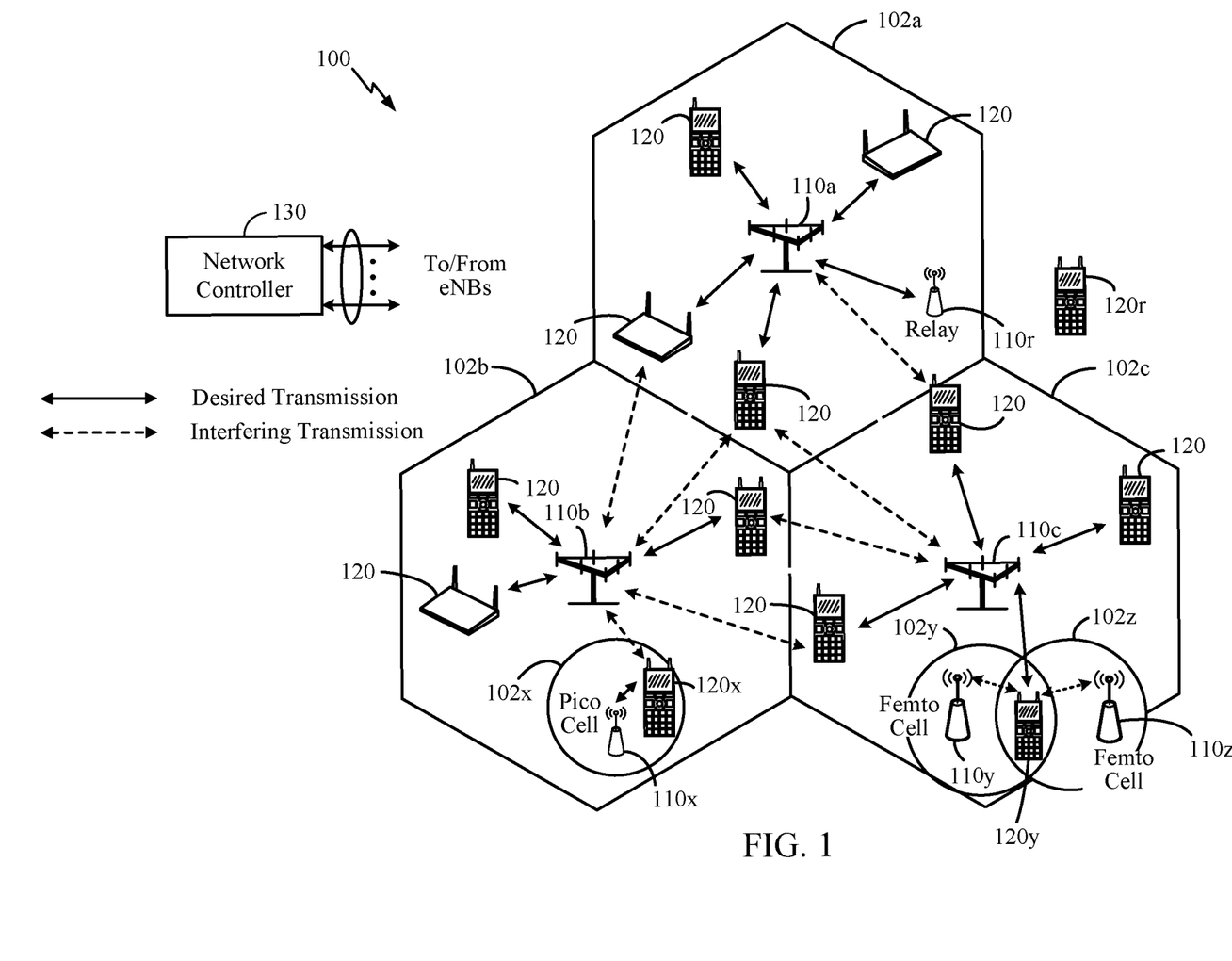
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 (e.g., 120x, 120y) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a tablet, a netbook, a smartbook, an ultrabook, instruments/sensors/monitors (e.g., power meters, water meters, heart rate monitors, temperature sensors, moisture sensors, positioning devices), etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
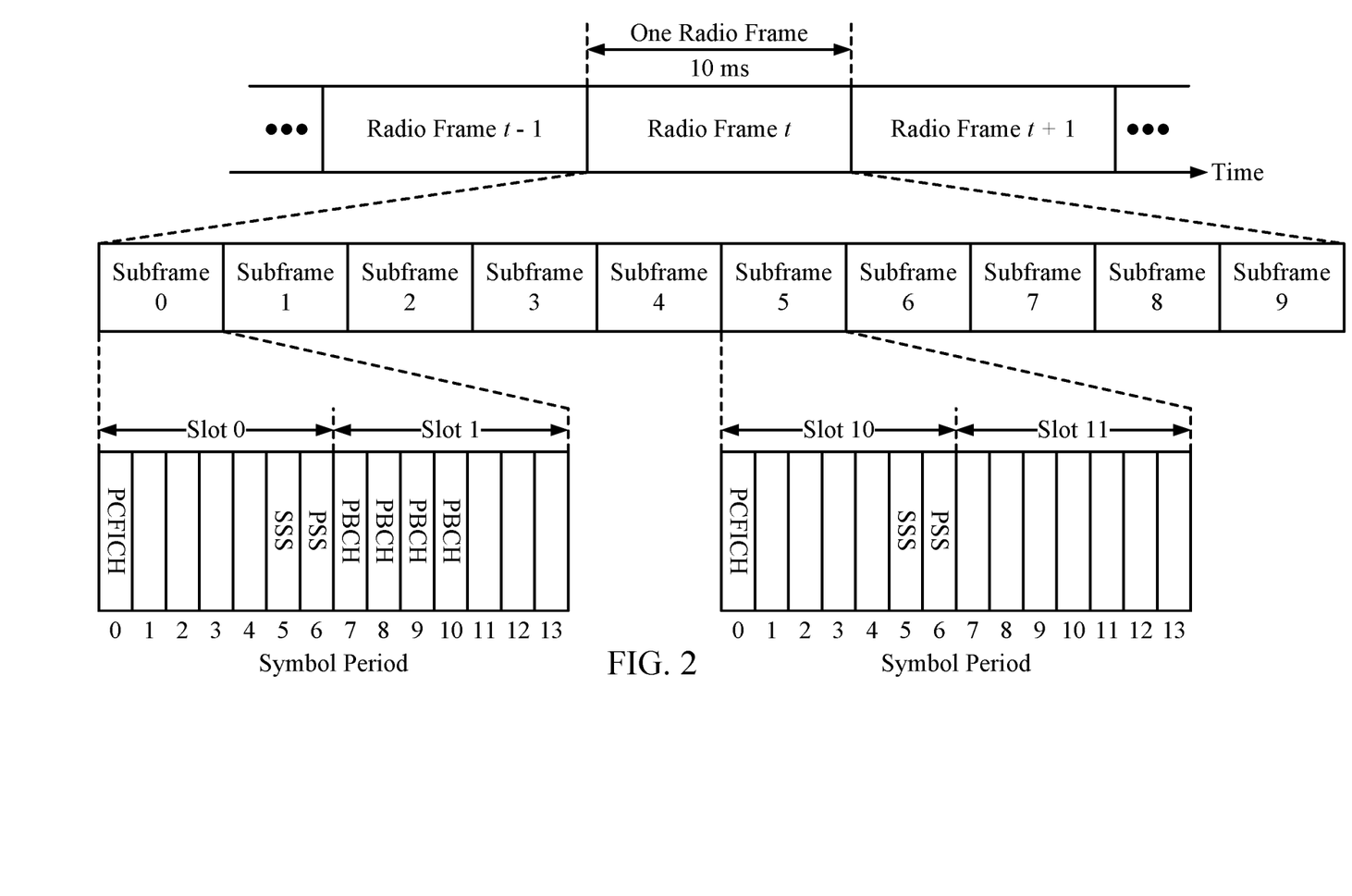
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
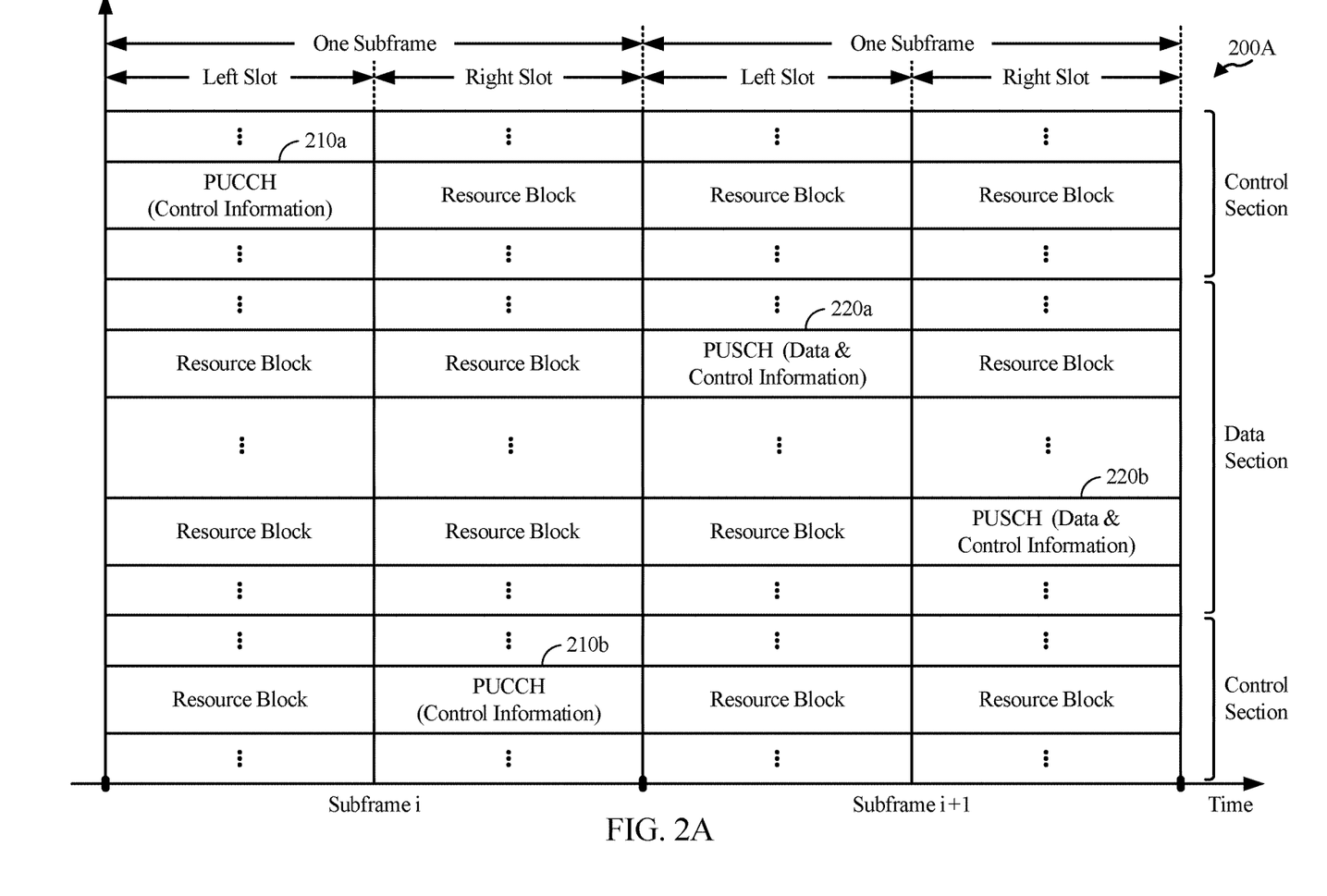
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power. UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
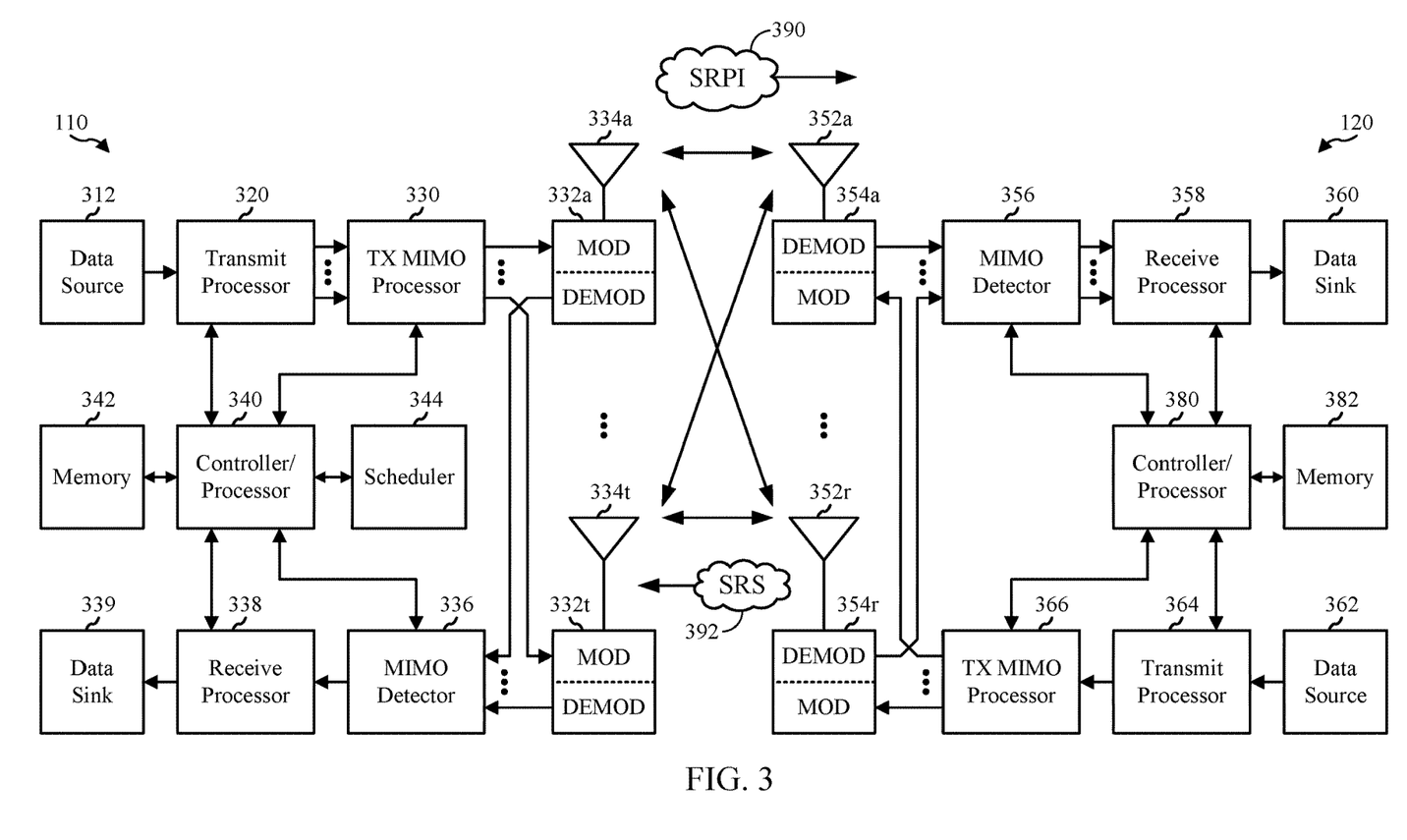
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations/processes for the techniques described herein. The controller/processor 380, receive processor 358, and/or other processors and modules at the UE 120 may perform or direct operations 900 in FIG. 9 and/or other processes for the techniques described herein. The memories 342 and 382 may store data and program codes for the eNB 110 and the UE 120, respectively. A scheduler 344 may schedule UEs for data transmission on the downlink and/or uplink. eNB 110 may transmit static resource partitioning information (SPRI) 390 to UE 120. UE 120 may transmit sounding reference signals (SRS) 392 to eNB 110.

The design of mobile systems for use in LTE networks has traditionally focused on generating improvements in spectral efficiency, expanded coverage and enhanced Quality of Service (QoS) support. This focus has led to wide availability of high-end mobile devices such as state-of-the-art smart phones, tablets, and the like. However, there is also a need to support low-cost devices.

Certain on-going studies are examining ways in which the demand for low cost machine type communications (MTC) devices can be met through adjustments or improvements in networks, such as LTE networks. Ideas under consideration include low cost UEs—based on reduction of maximum bandwidth, single receive radio frequency (RF) chains, reduction of peak rate, reduction of transmit power, and half-duplex operation.

Since the anticipated data rate for such low-cost devices is less than 100 kbps, cost savings may be achieved by operating these devices only within a narrowband width. Consequently, there is a need for improved mobile system operations that will allow narrowband operations within networks, such as an LTE network, without imposing substantial impact on device performance or requiring excessively burdensome adjustments to LTE specifications.

Various scenarios may be considered. One deployment scenario involves setting aside some narrow bandwidth outside of existing wide bandwidth, e.g. 1.25 MHz, to support the MTC operations.

In another scenario, low-cost UEs may be operated in existing large bandwidth. In this manner, low-cost UEs may co-exist with regular existing (i.e. "legacy") UEs.

There are various possible approaches for low-cost UEs in a large bandwidth. In one approach, low-cost UEs still operate at the same large bandwidth (e.g., up to 20 MHz.) This may have no standard impact, but also may not be helpful in reducing cost and battery power consumption.

Another approach, presented herein, involves operating low-cost UEs within a smaller bandwidth of the existing wide bandwidth. For example, low-cost UEs may be operated in 1.25 MHz (6 RBs). However, there may be several challenges to operate low cost UEs with a minimal impact, in terms of standards changes and performance.

Figure 4:
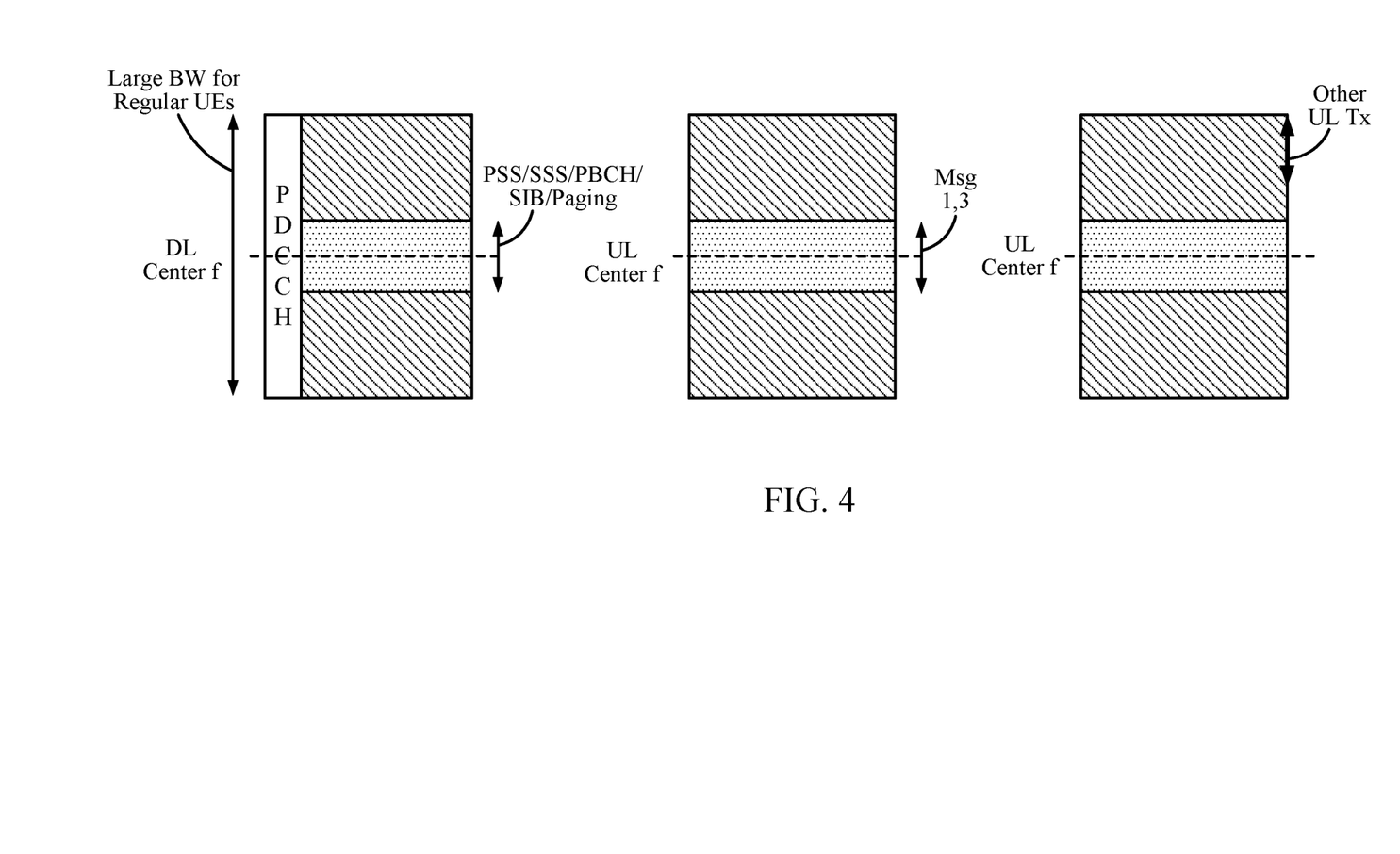
FIG. 4 illustrates an example network frequency spectrum configuration for Uplink and Downlink transmissions by low cost UEs.

As illustrated in FIG. 4, for both DL (downlink) and UL (uplink), the UE may operate in a small bandwidth (for example 1.25 MHZ) which falls within the larger bandwidth. The location of the bandwidth in the frequency spectrum may be anywhere within the larger bandwidth, including at the center of the larger bandwidth. Furthermore, UL Random Access Channel (RACH) procedures may utilize frequencies near the center of the bandwidth, which may facilitate system access by the low cost UEs. Other UL transmissions, however, may be in a different location.

Significant standard changes may be expected for narrow band operation in a large band. On the downlink (DL), since the legacy Physical Control Format Indicator Channel (PCFICH)/Physical HARQ Indicator Channel (PHICH)/Physical Downlink Control Channel (PDCCH) may be spread over the large bandwidth. In some embodiments, different signaling methods may have to be introduced for MTC devices.

In some embodiments, all Physical Downlink Shared Channel (PDSCH) transmissions may be restricted to be narrowband and based on UE reference signals (RS). For control channel, narrow bandwidth support may be achieved by the new control channel (ePDCCH or enhanced PDCCH) once the channel is configured. One drawback is that many procedures (e.g., RACH and paging) may need to be redefined before ePDCCH is configured.

On the uplink (UL), PUSCH/PUCCH may be restricted to narrow bandwidth. Spec changes may be required to ensure PUCCH does not hop across the entire UL bandwidth. PUSCH, for low-cost UEs, may co-exist with PUSCHs of other UEs—thus, there may be scheduling restrictions. Performance loss for both PUSCH and PUCCH may be expected due to narrowband operation. Frequency diversity gain may be achieved in the large bandwidth by hopping from one resource in the first slot (or one subframe) to the second slot (or another subframe) for the same channel. It may be noted that while for DL narrowband operations the eNB can power boost the narrowband channels to compensate for performance loss due to the narrowband operation, power boosting for UL may not be possible for power limited UEs.

Additionally, there may be some impact on various procedures. For example, for System Information Block (SIB) decoding, all SIB decoding may be narrowband for MTC. RACH procedure may be impacted starting from Msg 2. Current paging relies on PDCCH that spans the entire DL bandwidth.

It may be desirable to minimize impact of standards changes required for the support of low cost devices. Performance impact should be minimized for the support of low cost devices. Any significant performance impact may imply reduced coverage and/or additional deployment cost. Low cost devices may have uneven traffic needs. Typically, the UL has much more traffic than DL.

Figure 5:
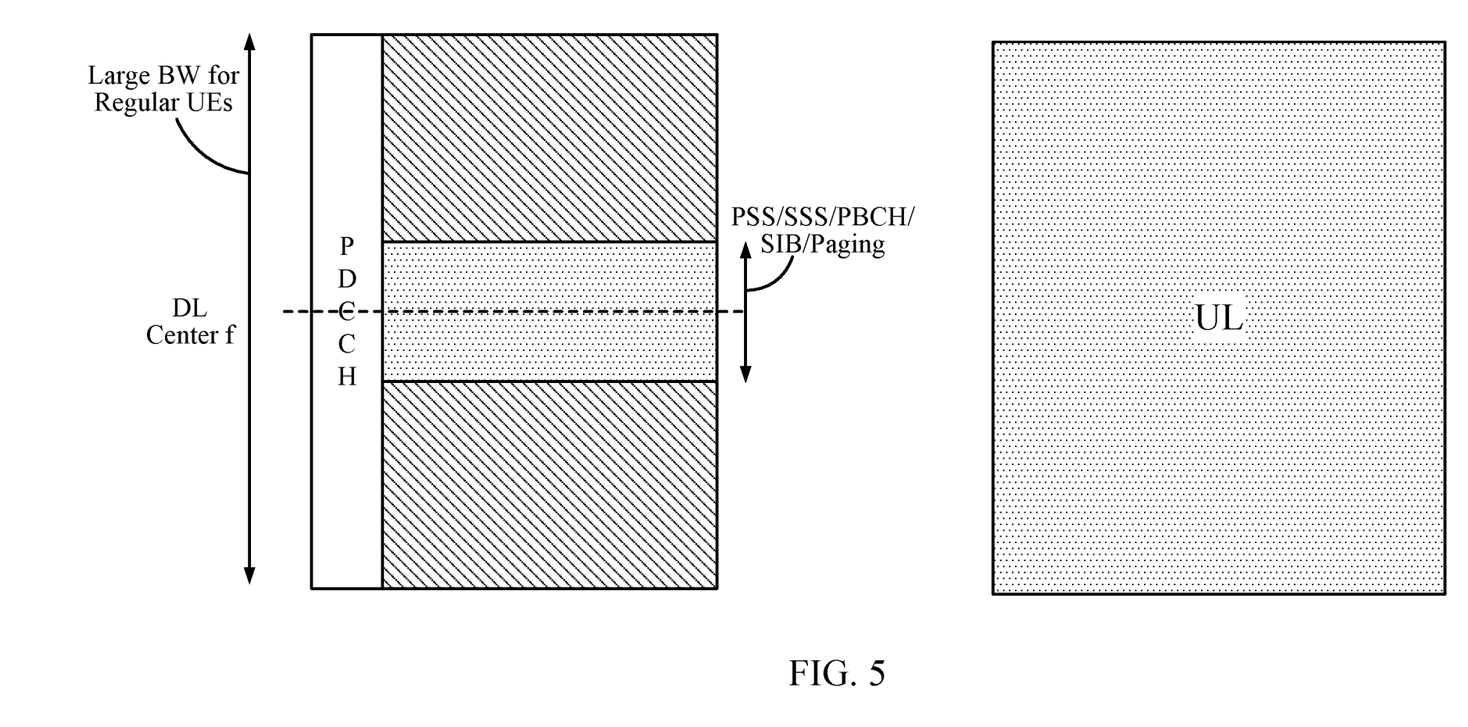
FIG. 5 illustrates an example network frequency spectrum configuration for Uplink and Downlink transmissions by low cost UEs, in accordance with aspects of the present disclosure.

FIG. 5 illustrates an example embodiment for low cost UE operations. As illustrated, downlink transmissions may continue to use narrowband operations, while uplink transmissions may occupy the entire large bandwidth. The PUSCH for low cost UEs may be limited in its size with respect to consumed resource blocks (RBs), but may be unrestricted as to its location in the spectrum. Furthermore, PUSCH parameters such as modulation order, rank, etc., may be restricted—for example, to the use of only quadrature phase shift keying (QPSK) or rank 1 transmissions. Furthermore, the RB size limitation for PDSCH and PUSCH may be different (e.g., larger size for PUSCH).

Different sizes for DL and UL resources may permit different sizes DCI for DL grants and UL grants. Typically, DCI formats 1A (i.e., DL grant) and DCI format 0 (i.e., UL grant) have the same size in order to reduce the number of PDCCH blind decodes. However, with different DL and UL bandwidths, DCI format 1A and DCI format 0 may not be the same size (i.e., no size matching). In some embodiments, low-cost UEs may be specified that in any given subframe, there is at most one PDSCH—which may simplify decoding burden.

The example configuration shown in FIG. 5 may minimize or avoid impact to existing standards. Furthermore, PUCCH or PUSCH may still hop using the entire bandwidth. Additionally, this configuration may serve to address the traffic imbalance between DL and UL communications which is a characteristic of low-cost UEs. For example, the narrow bandwidth provided for downlink transmissions may be adequate for the amount of downlink activity required of low cost UEs.

However, this configuration may have some drawbacks. For example, UL may still need wideband Fast Fourier Transform (FFT). From low-cost UE perspective, reception of DL channels in a narrow band is generally easier (e.g., cheaper) than in a wide band. Typically it is easier to transmit than to receive. Thus, limiting DL bandwidth for low-cost devices is expected to result in some cost savings, and more cost savings are expected from limiting DL bandwidth than from limiting UL bandwidth. The impact due to DL narrow band operation may be greater than the impact due to UL narrow band operation.

Figure 6:
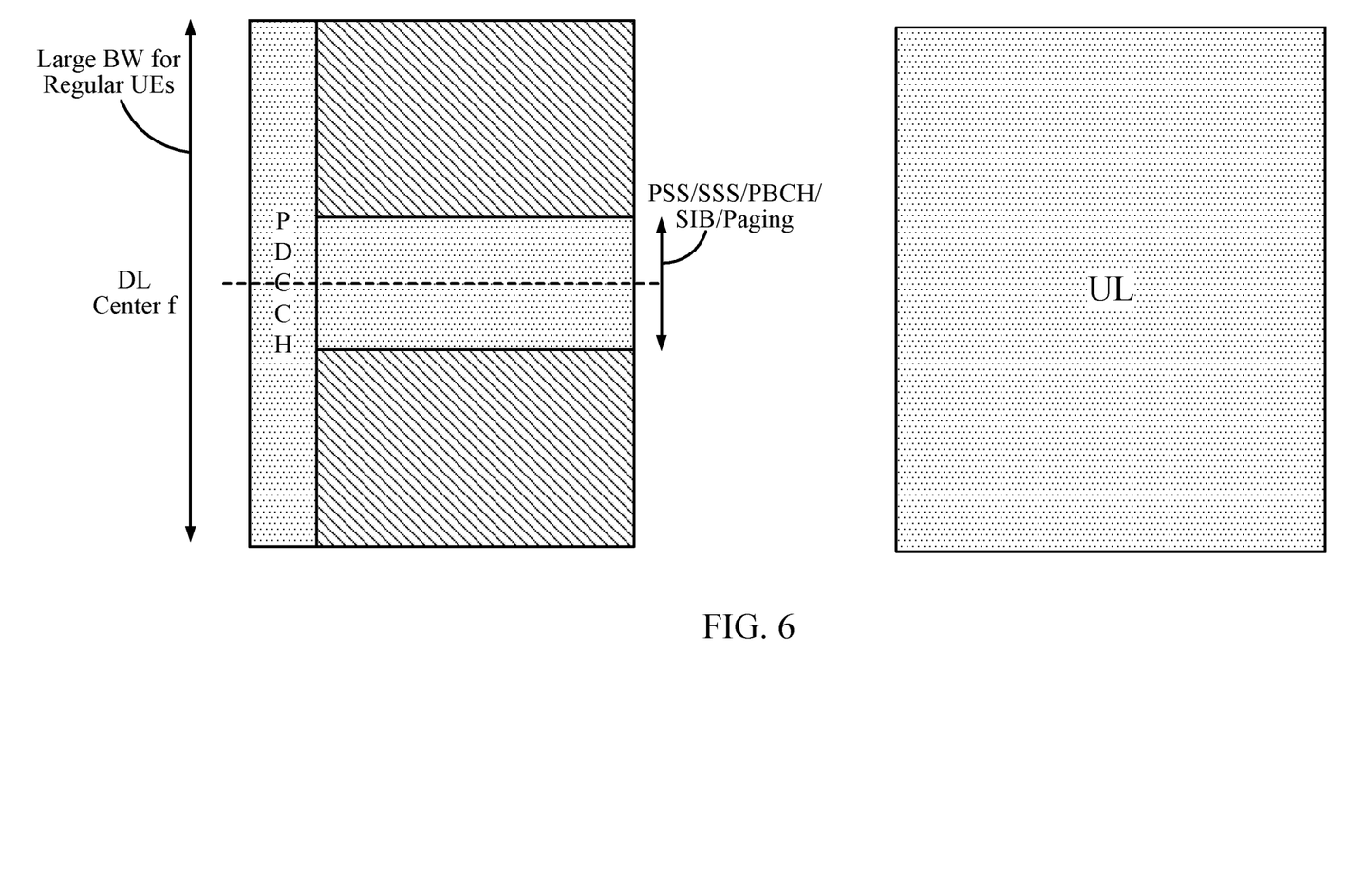
FIG. 6 illustrates an example network frequency spectrum configuration for Uplink and Downlink transmissions by low cost UEs, in accordance with aspects of the present disclosure.

FIG. 6 illustrates another example configuration for low cost UEs. In this embodiment, the control region portion of a downlink subframe may be wideband, but PDSCH may be limited to a narrow band with a fixed frequency location set by standards or by the Radio Resource Control (RRC). For example, the PDSCH may consume the six center RBs. The subframe where control is transmitted may be the same or different from the subframe used to transmit PDSCH, allowing for cross-subframe assignments and, therefore, relaxed H-ARQ timing requirements. Additionally, low cost UE operations may be configured so that in any given subframe, there is at most one PDSCH.

As seen in FIG. 6, UL transmissions may operate across the entire large bandwidth, with the possibility of limitations imposed on assignment size. Additionally, PDSCH and PUSCH may have different size limitations. In some embodiments, all PDCCH may be from a legacy control region. In other embodiments, some PDCCHs may be from a legacy region and be from ePDCCH. For example, SIB, Random Access Radio Network Temporary Identifier (RA-RNTI), and Paging RNTI (P-RNTI) may be sent via PDCCH and Unicast may be sent via ePDCCH.

Advantages to the approach shown in FIG. 6 may include little or no UL standard impact, little or no UL performance impact (e.g., PUCCH and PUSCH can still hop using the entire bandwidth), it can address the traffic imbalance between DL and UL for low cost UEs, and little or no DL standards change impact, and narrow band PDSCH—or narrowband FFT in the data region. Challenges may include the need for wideband FFT for UL and DL legacy control, and PDSCH for broadcasts (e.g., SIB) may have to be scheduled in the center for low cost devices. The same PDSCH may be used for regular UEs or, alternatively, regular UEs may be signaled to decode PDSCH of a different location—which may depend on eNB implementation. For low-cost devices, decoding of broadcast can be made much less often compared with that for regular UEs (e.g., on the order of seconds).

Figure 7:
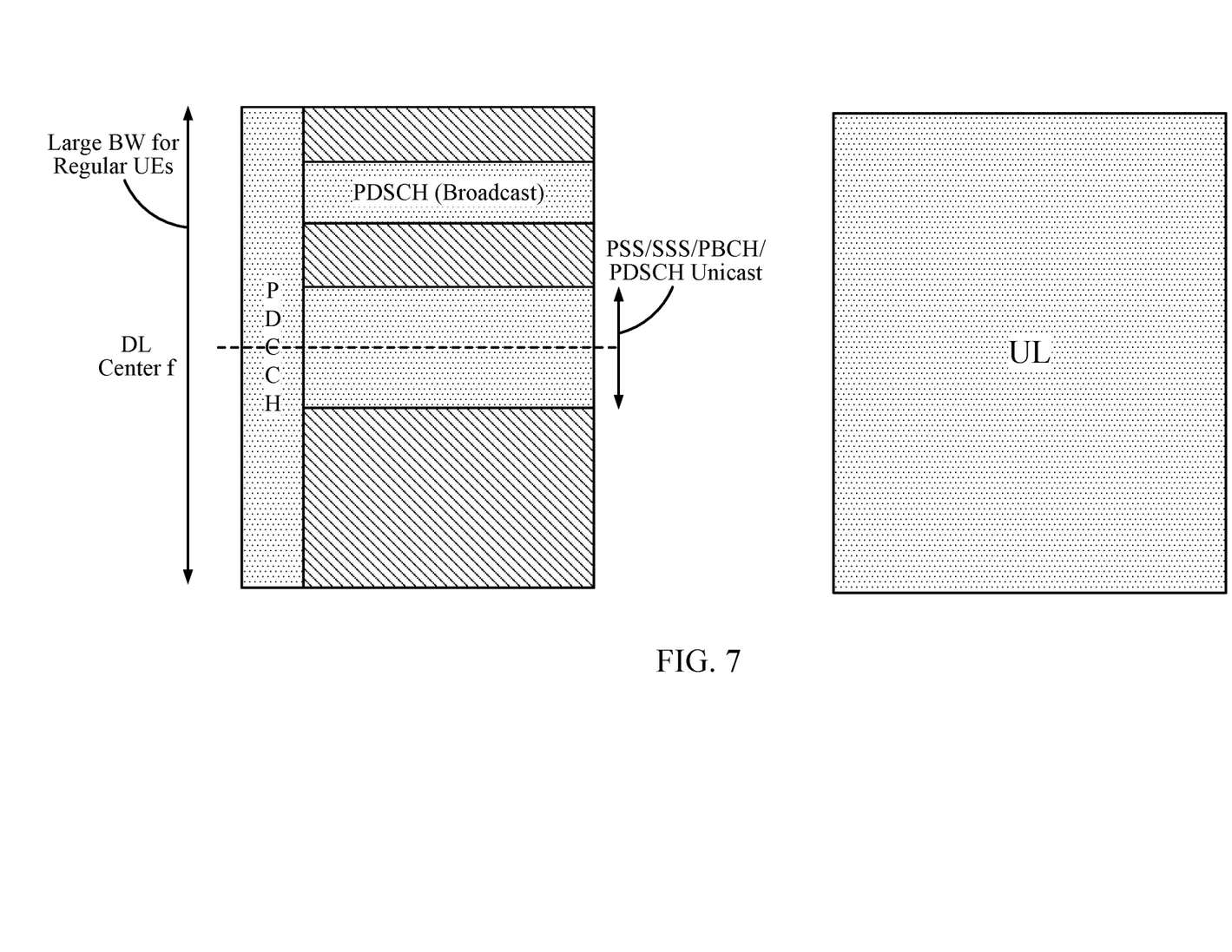
FIG. 7 illustrates an example network frequency spectrum configuration for Uplink and Downlink transmissions by low cost UEs, in accordance with aspects of the present disclosure.

FIG. 7 illustrates an example configuration in which the control region in DL is wideband, but PDSCH only exists in a narrow band. The location of the narrow band for unicast PDSCH is fixed (e.g., 6 RBs). In some embodiments, the subframe where control is transmitted may be the same or different from the subframe unicast PDSCH is transmitted (e.g., cross-subframe scheduling). The location of the narrow band for broadcast PDSCH depends on the scheduling decision. In some embodiments, the subframe where control is transmitted may be the same or different from the subframe unicast PDSCH is transmitted (i.e., cross-subframe scheduling). It may be advantageous to transmit the control subframe in a different subframe from the unicast PDSCH subframe, such that the UE does not need to buffer the entire bandwidth.

In some embodiments, low-cost UEs may be specified such that in any given subframe, there is at most one PDSCH. In this arrangement, broadcast PDSCH may be more flexibly shared between regular UEs and low-cost UEs. In some embodiments, the size limitation for PDSCH and for PUSCH may be different (e.g., larger size for PUSCH).

Figure 8:
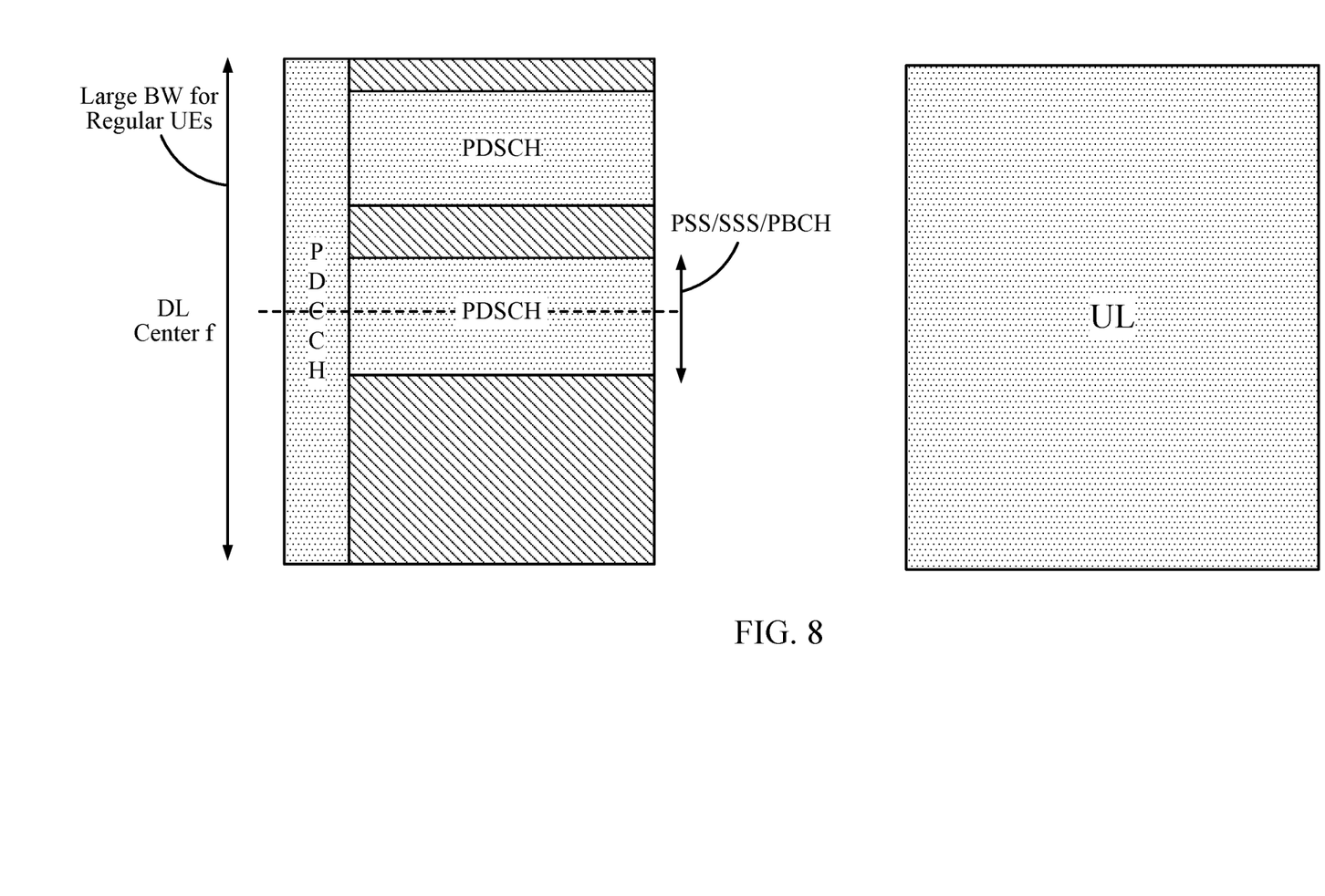
FIG. 8 illustrates an example network frequency spectrum configuration for Uplink and Downlink transmissions by low cost UEs, in accordance with aspects of the present disclosure.

FIG. 8 illustrates an example configuration in which the control region in DL is wideband, but PDSCH is narrow band (e.g., 6 RBs) and may be located in any part of the large band based on scheduling decision. In some embodiments, the subframe where control is transmitted may be the same or different from the subframe PDSCH is transmitted (i.e., cross-subframe scheduling), such that the UE doesn't need to buffer the entire bandwidth. Low-cost UEs may be specified that in any given subframe, there is at most one PDSCH. In this arrangement, PDSCH may be more flexibly scheduled in the entire band. The size limitation for PDSCH and for PUSCH may be different (e.g., larger size for PUSCH).

Figure 9:
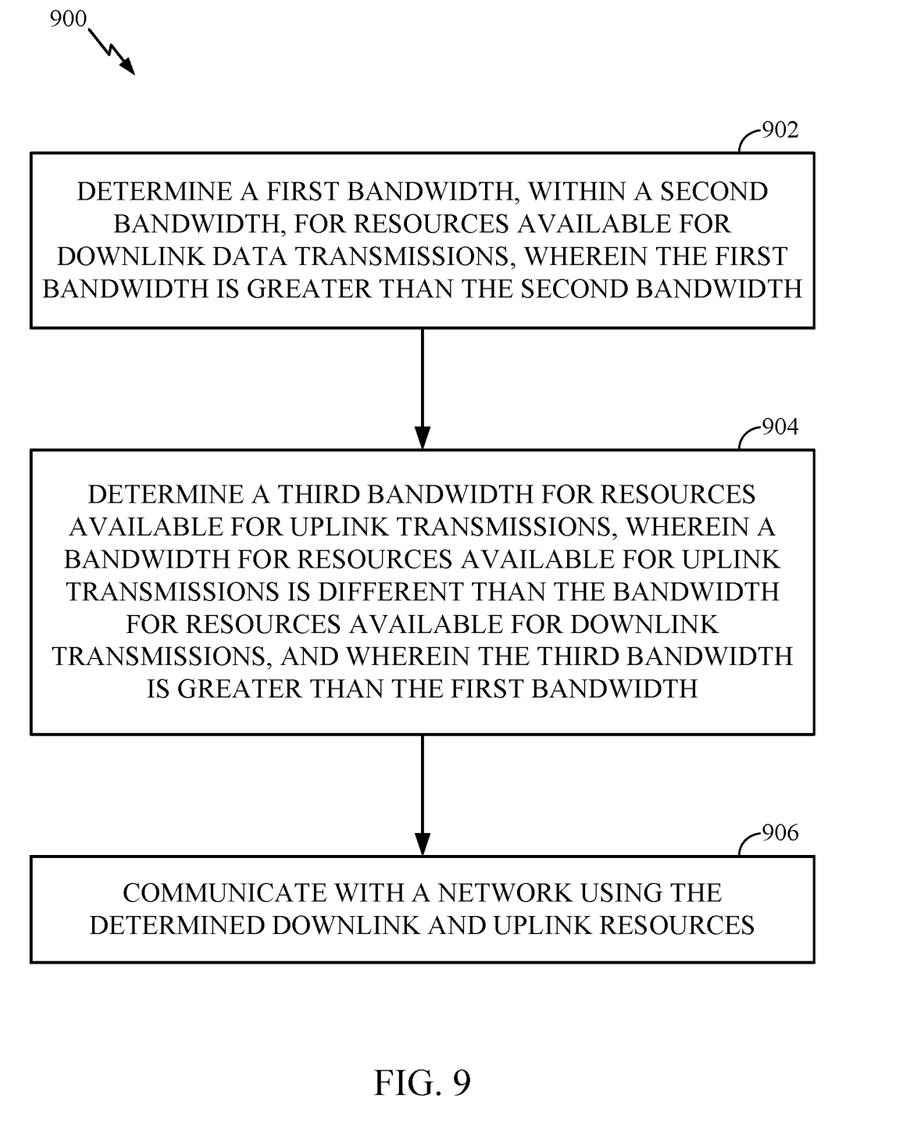
FIG. 9 illustrates example operations that may be performed by a UE, in accordance with aspects of the present disclosure.

FIG. 9 illustrates example operations 900 that may be performed, for example, by a UE, in accordance with aspects of the present disclosure. The operations 900 begin, at 902, by determining a first bandwidth, within a second bandwidth, for resources available for downlink data transmissions, wherein the first bandwidth is greater than the second bandwidth. At 904, the UE determines a third bandwidth for resources available for uplink transmissions, wherein a bandwidth for resources available for uplink transmissions is different than the bandwidth for resources available for downlink transmissions, and wherein the third bandwidth is greater than the first bandwidth. At 906, the UE communicates with a network using the determined downlink and uplink resources.

Similar ideas as presented herein may also be applied when ePDCCH (a narrowband control channel occupying legacy data region) is used for low cost UEs. ePDCCH and the correspondingly scheduled PDSCH may not belong to the same subframe (cross-subframe scheduling). A low cost UE can be indicated a first set of subframes for ePDCCH and a second set of subframes for PDSCH. The bandwidth (B1) containing ePDCCH and the bandwidth (B2) containing PDSCH can both be narrowband. B1 and B2 can be the same or different. The two sets can be mutually orthogonal. That is, for a low cost UE, a subframe may not contain ePDCCH (or PDCCH) or PDSCH simultaneously. From the low cost UE perspective, in any given subframe, the processing of ePDCCH or PDSCH may be always narrowband. Cross-subframe scheduling (ePDCCH is subframe n, and the corresponding PDSCH in subframe m where m>n) enables flexible DL resource management while still maintaining narrow band DL operation for the UE. The eNB can schedule PDSCH in any location of the wide band, while keeping the scheduled PDSCH to be narrowband. For simplicity, a low cost UE can also be configured so that it would monitor or decode at most N type(s) of signals/channels in any subframe: for example, N=1 and at most one of the PBCH/PSS/SSS (these three can be viewed as the same type), or broadcast PDSCH, or unicast PDSCH, or ePDCCH in a subframe.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as hardware, software/firmware, or combinations thereof. To clearly illustrate this interchangeability of hardware and software/firmware, various illustrative components, blocks, modules, circuits and steps have been described above generally in terms of their functionality. Whether such functionality is implemented as hardware and/or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, PCM (phase change memory), ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
   determining at least a first bandwidth part, comprising a first portion of a system bandwidth, for resources available for downlink data transmissions;
   determining at least a second bandwidth part, comprising a second portion of the system bandwidth, for resources available for uplink transmission, wherein a bandwidth size of the second portion available for uplink transmission is greater than the bandwidth size of the first portion available for downlink transmission, wherein:
      determining the at least a first bandwidth part comprises determining a plurality of bandwidth parts for resources available for downlink data transmission, or determining the at least a second bandwidth part comprises determining a plurality of bandwidth parts for resources available for uplink transmission, or both; and
      at least some of the plurality of bandwidth parts for resources available for downlink data transmission have different bandwidth sizes, or at least some of the plurality of bandwidth parts for resources available for uplink transmission have different bandwidth sizes, or both; and
   communicating with a network using the determined downlink and uplink resources.

2. The method of claim 1, wherein at least one of the first bandwidth part or the second bandwidth part is configured based on a capability of the UE.

3. The method of claim 1, wherein different bandwidth parts are configured for different types of signals.

4. An apparatus for wireless communications, comprising:
   means for determining at least a first bandwidth part, comprising a first portion of a system bandwidth, for resources available for downlink data transmissions;
   means for determining at least a second bandwidth part, comprising a second portion of the system bandwidth, for resources available for uplink transmission, wherein a bandwidth size of the second portion available for uplink transmission is greater than the bandwidth size of the first portion available for downlink transmission, wherein:
      determining the at least a first bandwidth part comprises determining a plurality of bandwidth parts for resources available for downlink data transmission, or determining the at least a second bandwidth part comprises determining a plurality of bandwidth parts for resources available for uplink transmission, or both; and
      at least some of the plurality of bandwidth parts for resources available for downlink data transmission have different bandwidth sizes, or at least some of the plurality of bandwidth parts for resources available for uplink transmission have different bandwidth sizes, or both; and
   means for communicating with a network using the determined downlink and uplink resources.

5. The apparatus of claim 4, wherein at least one of the first bandwidth part or the second bandwidth part is configured based on a capability of the UE.

6. The apparatus of claim 4, wherein different bandwidth parts are configured for different types of signals.

7. An apparatus for wireless communications, comprising:
   at least one processor coupled with a memory and configured to:
      determine at least a first bandwidth part, comprising a first portion of a system bandwidth, for resources available for downlink data transmissions; and
      determine at least a second bandwidth part, comprising a second portion of the system bandwidth, for resources available for uplink transmission, wherein a bandwidth size of the second portion available for uplink transmission is greater than the bandwidth size of the first portion available for downlink transmission, wherein:
         determining the at least a first bandwidth part comprises determining a plurality of bandwidth parts for resources available for downlink data transmission, or determining the at least a second bandwidth part comprises determining a plurality of bandwidth parts for resources available for uplink transmission, or both; and
         at least some of the plurality of bandwidth parts for resources available for downlink data transmission have different bandwidth sizes, or at least some of the plurality of bandwidth parts for resources available for uplink transmission have different bandwidth sizes, or both; and
   a transceiver configured to communicate with a network using the determined downlink and uplink resources.

8. The apparatus of claim 7, wherein at least one of the first bandwidth part or the second bandwidth part is configured based on a capability of the UE.

9. The apparatus of claim 7, wherein different bandwidth parts are configured for different types of signals.

10. A non-transitory computer readable medium having computer executable code stored thereon for wireless communications, comprising:
    code for determining at least a first bandwidth part, comprising a first portion of a system bandwidth, for resources available for downlink data transmissions;
    code for determining at least a second bandwidth part, comprising a second portion of the system bandwidth, for resources available for uplink transmission, wherein a bandwidth size of the second portion available for uplink transmission is greater than the bandwidth size of the first portion available for downlink transmission, wherein:
       determining the at least a first bandwidth part comprises determining a plurality of bandwidth parts for resources available for downlink data transmission, or determining the at least a second bandwidth part comprises determining a plurality of bandwidth parts for resources available for uplink transmission, or both; and at least some of the plurality of bandwidth parts for resources available for downlink data transmission have different bandwidth sizes, or at least some of the plurality of bandwidth parts for resources available for uplink transmission have different bandwidth sizes, or both; and code for communicating with a network using the determined downlink and uplink resources.

* * * * *